C. S. BAVIER.
DEVICE FOR LUBRICATING INTERNAL COMBUSTION ENGINES.
APPLICATION FILED MAY 10, 1912.

1,057,112. Patented Mar. 25, 1913.

Witnesses:

Inventor
Charles S. Bavier
By his Attorney
D. Walter Brown

UNITED STATES PATENT OFFICE.

CHARLES S. BAVIER, OF NEW YORK, N. Y.

DEVICE FOR LUBRICATING INTERNAL-COMBUSTION ENGINES.

1,057,112.  Specification of Letters Patent.  Patented Mar. 25, 1913.

Application filed May 10, 1912. Serial No. 696,295.

*To all whom it may concern:*

Be it known that I, CHARLES S. BAVIER, a citizen of the United States, and a resident of the borough of Manhattan, in the county of New York and State of New York, have invented certain new and useful Improvements in Devices for Lubricating Internal-Combustion Engines, of which the following is a specification.

This invention relates to improvements in devices for lubricating internal combustion engines.

By reason of the high temperatures and other conditions prevailing in the operation of internal combustion engines, the proper lubrifaction of the cylinder of the engine is rendered unusually difficult, and the use of the ordinary liquid lubricants is attended with such carbonization of the engine and its valves that such lubricants are very undesirable.

It is the purpose of this invention to provide effective lubrifaction, without risk of carbonization, by equipping the piston with a transversely movable ring of suitable lubricating material. This ring is employed in combination with the gas-tight spring packing ring, and the walls of the cylinder and the surface of the piston are effectually lubricated, and so that the said packing ring will not score or injure the cylinder wall.

Figure 1:
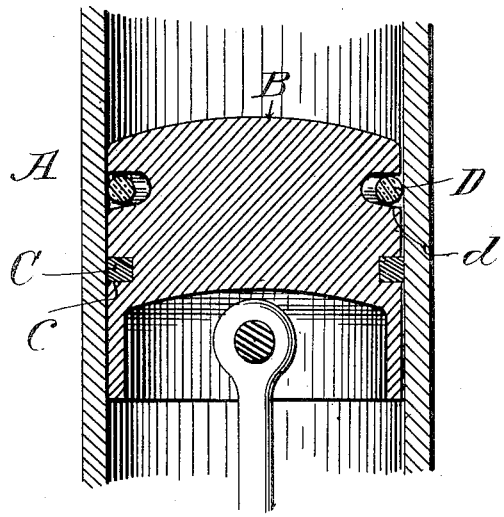
Figure 2:
Figure 3:
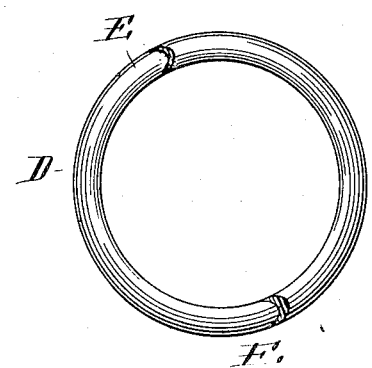

Referring to the drawings which accompany the specification to and the description, Figure 1 is a longitudinal broken section of a cylinder and a piston of an internal combustion engine equipped with the invention. Fig. 2 is an edge elevation of the lubricating ring. Fig. 3 is a plan view of said lubricating ring.

A is the cylinder arranged with its axis vertical, and B the piston. Said piston B has a small clearance in said cylinder A, and is made tight in said cylinder by the gas-tight spring ring C, secured in a circumferential recess $c$, around said piston B in the usual manner.

A ring D of any suitable lubricating material, such as lead or its alloys, soft brass, Babbitt metal, or other lubricating material, is located loosely in a circumferential recess $d$ formed in said piston B. The depth of said recess $d$ is a little greater than the diameter of said ring D, which is preferably circular in cross section, so that said ring D is capable of a little transverse motion in said recess, and the top and bottom of said recess $d$ are inclined in order to produce a thrust of the ring D outwardly toward the cylinder wall. To facilitate said transverse movement of said ring D, and also to facilitate assembling said ring D in its recess, I prefer to form said ring in two parts provided with beveled meeting ends $e$, $e'$. Said ring D constitutes in effect a split ring, and the said two parts can work a little in and out with respect to each other; the transverse motion of said ring D in said recess $d$, as the piston B reciprocates causing said ring D to touch and deposit lubricant first on one, then on another part of the wall of the cylinder A, and the packing ring C quickly spreads the lubricant over the entire working surface of the cylinder A and effectually lubricates the same.

Now having described my improvements, I claim as my invention.

1. The combination with a cylinder and a reciprocating piston of an internal combustion engine, of a transversely movable ring of lubricating material mounted on the periphery of said piston, substantially as described.

2. The combination in lubricating devices for internal combustion engines of a piston provided with a circumferential recess, a ring of lubricating material located loosely in said recess, and a packing ring on said piston, substantially as described.

3. The combination in lubricating devices for internal combustion engines, of a piston provided with a circumferential recess, a movable split ring of lubricating material located loosely in said recess, and a packing ring on said piston, substantially as described.

4. The combination in an internal combustion engine, of a piston provided with a circumferential recess having inclined walls, a transversely movable ring of lubricating material positioned loosely in said recess and impelled outwardly by said walls, and a packing ring on said piston, substantially as described.

Signed at New York city in the county of New York and State of New York this 4th day of May, A. D. 1912.

CHARLES S. BAVIER.

Witnesses:
WALTER N. HARRIS,
G. W. HOPKINS.